United States Patent [19]

Hildebrand et al.

[11] 4,254,855
[45] Mar. 10, 1981

[54] COAXIAL SPRING DAMPER DRIVE

[75] Inventors: William G. Hildebrand, Fort Wayne; James K. Tarlton, Auburn, both of Ind.

[73] Assignee: Dana Corporation, Toledo, Ohio

[21] Appl. No.: 49,847

[22] Filed: Jun. 18, 1979

[51] Int. Cl.³ .................... F16D 3/14; F16D 69/00; F16D 3/80
[52] U.S. Cl. .................... 192/106.2; 64/27 S
[58] Field of Search .................... 192/106.2, 106.1; 64/27 S

[56] References Cited

U.S. PATENT DOCUMENTS

| | | | |
|---|---|---|---|
| 1,347,907 | 7/1920 | Kronfeld | 64/27 S |
| 2,072,561 | 3/1937 | Kuhns | 64/27 |
| 2,920,733 | 1/1960 | Lysett | 192/1)7 |
| 3,101,600 | 8/1963 | Stromberg | 192/106.1 |
| 3,138,093 | 6/1964 | Zeidler | 74/574 |
| 3,380,566 | 4/1968 | Cook | 192/106.2 UX |

*Primary Examiner*—Doris L. Troutman
*Attorney, Agent, or Firm*—Robert M. Leonardi; Norb A. Heban

[57] ABSTRACT

A clutch driven disc assembly is disclosed having coaxial damPer springs between rotary elements of the disc assembly. An auxiliary cover is combined with a main cover to drive the inner springs and to create additional drive surfaces for the outer springs. Aligned openings in the main and auxiliary covers house the coaxial springs. The covers are secured to one of the rotary elements of the disc assembly so that side walls in the main and auxiliary cover openings engage and drive both springs while the inner spring is engaged and driven only by the opening side walls of the auxiliary cover.

7 Claims, 6 Drawing Figures

COAXIAL SPRING DAMPER DRIVE

BACKGROUND OF THE INVENTION

This invention relates to rotary torque transmitting devices in general and is particularly directed to a damper arrangement for these devices.

In conventional passenger cars and trucks, objectionable driveline vibrations may occur at certain speeds and load conditions. Some of these disturbances may be eliminated or reduced to an acceptable level with the incorporation of a torsional damper in the driven disc portion of the vehicle clutch. Damping is normally provided by a plurality of circumferentially spaced coiled springs operatively connected between relatively rotatable elements of the clutch driven disc assembly.

Clutches with dampers are widely used in all types of power transmissions systems. In recent years, particularly in the heavy duty field, conventional spring dampers have not performed satisfactorily when used with the newer higher torque engines. Due to greater horsepower output, these engines operate in a critical torsional range and, as a result, impose considerably higher loads on the spring damper than previous engines. This translates into greatly increased stresses on the damper springs which can increase damper spring failure. Additional clutch damage and rapid wear of the associated transmission input shaft and vehicle drive line components may follow.

Attempts have been made to increase the torque capacity of heavy duty clutch driven disc assemblies but, for one reason or another, have not been entirely satisfactory.

Known devices have increased the torque capacity by disposing a second smaller diameter coil spring within the primary spring. Such a design is advantageous because it requires no additional space and can be used in the restricted axial space required in present passenger car and light truck applications.

Other devices are known which are designed specifically for heavy duty applications. These are, however, more complex and further require additional radial and sometimes axial space ordinarily not available in heavy duty clutch applications. Additional capacity is built into driven discs of this type by providing two or more radially spaced sets of coaxial springs with each set designed to come into play during various stages of relative rotation between the rotary clutch disc elements. Not only are these more complex but, as stated, they also pose space limitation problems since the radial diameters must be increased to accomodate the added spring sets.

While the coaxial spring concept is not new, it has been found that, due to the different spring diameters, the most satisfactory drive surface area is not always provided for both springs. In some instances, because of the spring end configuration and the constant loads being applied to the cover opening side walls by the spring ends, the localized contact points are susceptible to damage and as a result, premature clutch cover and spring failure.

It is an object of the present invention to provide a clutch driven disc with an improved coaxial damper spring mounting which will increase the drive surface area for both springs and not require any additional space to accomplish the desired result.

SUMMARY OF THE INVENTION

The above and other objects are achieved in the present invention by providing a two-part cover designed to house a plurality of circumferentially spaced coaxial damper springs positioned in aligned openings formed in each cover part. The openings in one cover part engage the ends of both springs while the other cover part engages only the ends of one spring.

DESCRIPTION OF A PREFERRED EMBODIMENT

Figure 1:
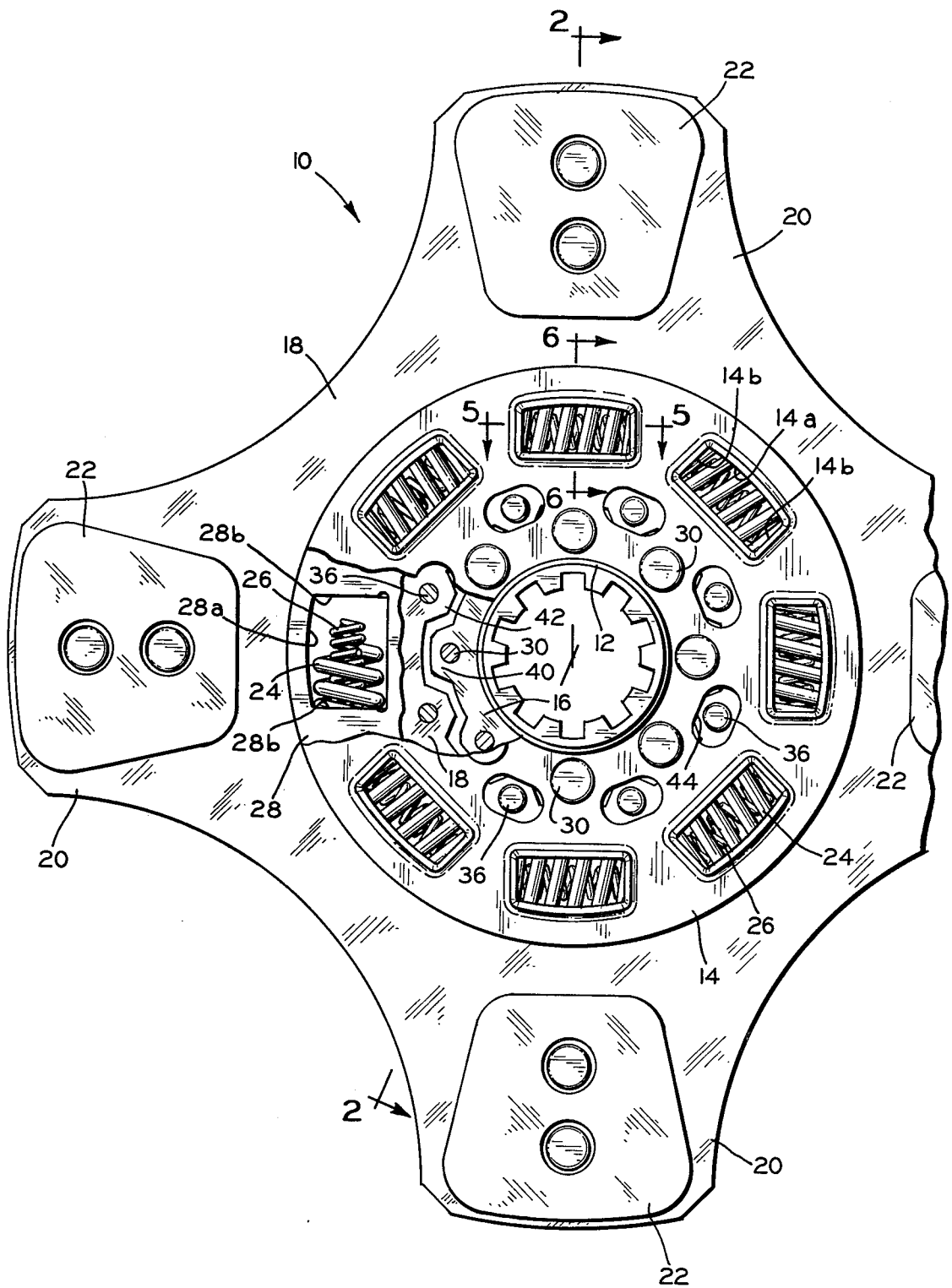
FIG. 1 is a partially broken away end elevational view of a clutch driven disc assembly incorporating the principles of the present invention.
Figure 2:
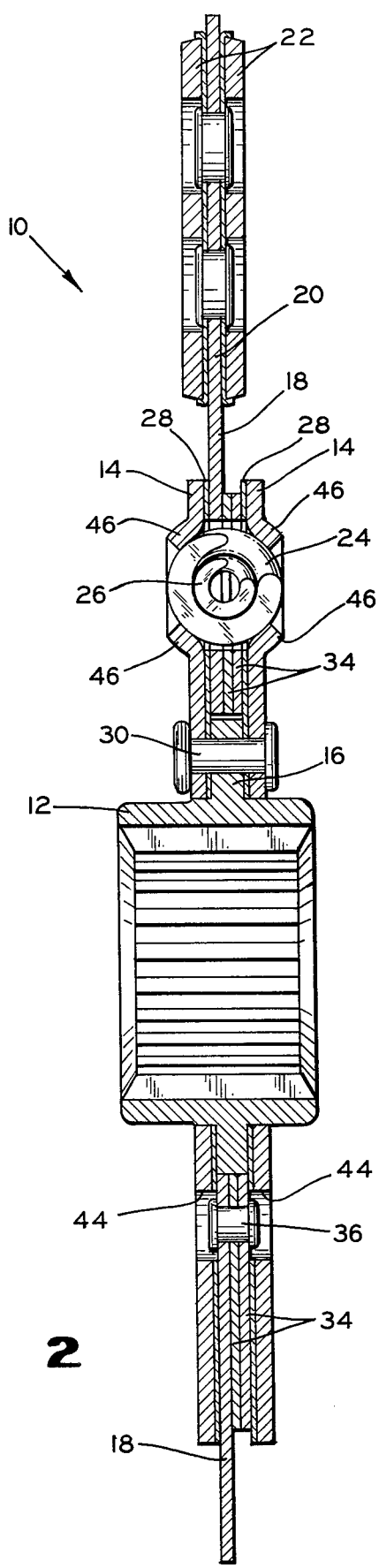
FIG. 2 is a sectional view taken along lines 2—2 of FIG. 1.
Figure 3:
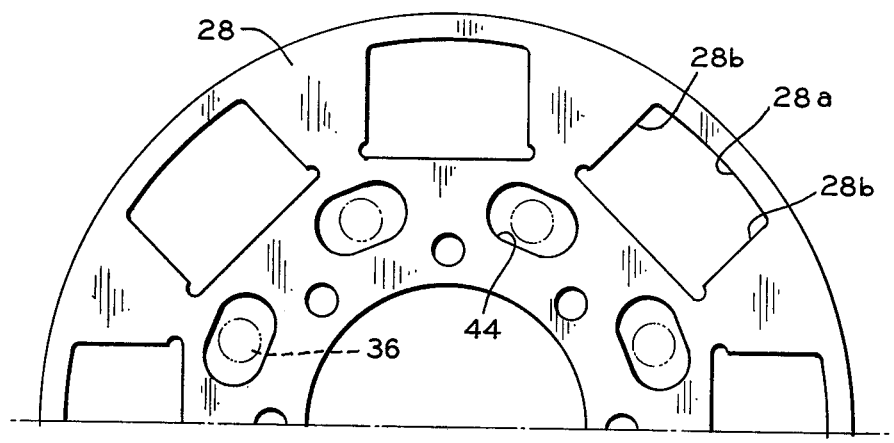
FIG. 3 is a partial end elevational view of one of the cover plates shown in FIG. 1.
Figure 4:
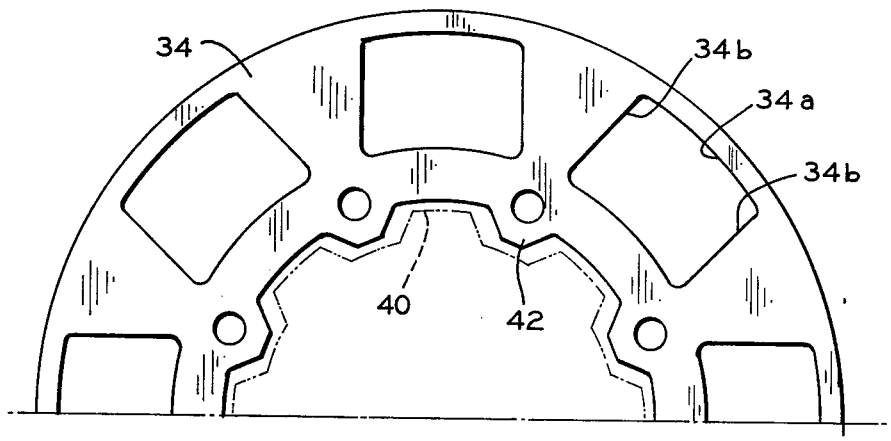
FIG. 4 is a partial end elevational view of one of the disc plates shown in FIG. 1.

Referring to FIGS. 1 and 2 of the drawings, in a preferred embodiment, the rotary torque transmitting device is a dampened drive disc assembly shown at 10. In normal practice, the disc assembly 10 is the driven portion of a clutch which is normally positioned in a vehicle power line between an engine and a transmission (not shown). The disc assembly 10 comprises rotary torque transmitting elements connected by a damper unit designed to establish a resilient drive between the rotary elements. The damper unit is needed to tune the vehicle drive train system so that critical torsional vibrations are moved out of the operating speed range of the engine and the rest of the drive train.

In the preferred embodiment, one rotary torque transmitting elements of the disc assembly 10 includes a rotatably hub 12 and a pair of spaced outer annular covers 14. An integral radial extending annular flange 16 is formed on the hub 12 with the covers 14 arranged on opposite sides of the flange 16.

The other rotary element of the disc assembly 10 includes a rotatable support plate 18 having integral radially outwardly extending arms 20. Friction pads 22 are secured to opposite sides of the outermost portions of the arms 20. Plate 18 is located in the axial space provided between outer covers 14.

As is well known, hub 12 is splined to a transmission input shaft (not shown) and the friction pads 22 are positioned between an axially movable clutch pressure plate and an axially stationary engine driven flywheel (not shown). Thus, disc assembly 10 is free to move axially on the transmission input shaft a limited distance but will always rotate with it.

It is essential that the damper unit not only establish the driving connection between the rotary clutch elements, but also absorb the torque of the engine, thereby eliminating chatter and rattle in the vehicle power line. The preferred embodiment includes resilient means comprising a first coil spring 24 and a second coil spring 26 coaxially disposed within the first coil spring 24. The resilient means consists of a plurality of circumferentially spaced spring sets adapted to operate on the same circumferential axis. Aligned openings 14a and 18a are provided in the covers 14 and plate 18 respectively for receiving and retaining the coaxial spring sets so that they are in a position to transmit drive between the covers 14 and plate 18.

In the preferred embodiment, secondary or auxiliary cover members are provided primarily to serve as drive means for the inner springs 26. However, due to their location, the auxiliary cover members also provide additional and improved drive surface area for outer springs 24, as will later be explained in more detail. The secondary or auxiliary cover members comprise a pair of flats, annular plates 28 located on opposite sides of the hub flange 16 and inside the outer or main covers 14. A series of rivets 30 extend through holes in the main and auxiliary covers 14 and 28 and hub flange 16 to secure the parts together as a unitary structure. Auxiliary covers 28 are formed with stamped openings 28a for alignment with main cover openings 14a and support plate openings 18a.

To substantially fill the axial space between the auxiliary covers 28, a plurality of flat, annular reinforcing plates 34 are positioned on one side of support plate 18. A Series of rivets 36 securely fasten the reinforcing plates 34 to supporting plate 18 so that they operate as a unit. Openings 34a are formed in reinforcing plates 34 identical to those provided in support 18.

From the description thus far, it will be evident that hub 12 and inner and outer covers 14 and 28, respectively, are secured together and will operate as the rotatable driven member of clutch disc assembly 10. The rotatable drive member of the clutch disc assembly 10 consists of support and reinforcing plates 18 and 34 respectively, described above.

In addition to the resilient drive connection provided by coaxial springs 24 and 26, a positive drive connection is also provided between the rotary clutch elements. The resilient drive is effective before the positive drive comes into play. This is accomplished by a lost motion connection designed to permit the coaxial springs 24 and 26 to function prior to any direct drive being established between the rotary clutch elements. Referring to FIG. 1, the lost motion is achieved through a plurality of outwardly directed teeth 40 on outer periphery hub flange 16 and a plurality of inwardly directed teeth 42 on the interior of support and reinforcing plates 18 and 34. The flange teeth 40 are normally maintained in a position mid-way and equally spaced from contact with the plate teeth 42. The spacing is designed to permit limited relative rotary movement between the hub 12 and plates 18 and 34 during which time the coaxial springs 24 and 26 function in their intended manner, i.e., absorb or prevent minor transmission of shock loads and torsional vibration in the driveline and establish the initial resilient drive connection between the rotary clutch elements prior to positive drive engagement of teeth 40 and 42.

As seen in FIG. 1, to accommodate the limited rotation that occurs between the hub 12 and plates 18 and 34, circumferentially elongated openings 44 are provided in covers 14 and 28 into which opposed heads of rivets 36 project. The openings 44 permit the necessary clearance for the rivet heads as the coaxial springs 24 and 26 are being compressed to establish the resilient driving connection or to absorb shocks and vibrations in the vehicle drive system.

Referring specifically to the resilient drive connection, the axially aligned openings in the outer and inner covers 14 and 28 and plates 18 and 34 are symmetrically circumferentially spaced adjacent the hub flange periphery. Inner cover openings 28a and plate openings 18a and 34a are substantially identical. Outer cover openings 14a, in addition to bieng similar in shape to inner cover openings 28a, also include short inwardly directed arcuate lips 46 extending toward each other. Lips 46 closely conform to the outer diameter of outer springs 24 and serve to retain the coaxial spring sets within the aligned openings. The lengths of all springs, both inner and outer, are substantially identical. When assembled, all springs are held in tension between the opposed thrust receiving side walls of the aligned openings.

Figure 5:
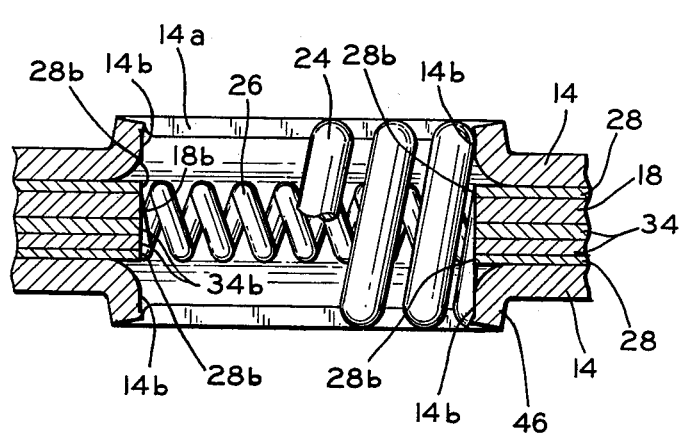
FIG. 5 is a fragmentary section view taken substantially along line 5—5 of FIG. 1 to more clearly show the resilient drive means and associate parts.

As illustrated best in FIG. 5, both springs 24 and 26 operate on the same axis and are positioned to be driven by outer and inner cover opening side walls 14b and 28b, respectively. Because of the cover and spring locations, the circumferentially spaced end walls 14b and 28b of both covers 14 and 28 are in constant driving contact with both inner and outer springs 24 and 26. However, due to the reduced diameter of inner spring 26, the spaced end walls 28b of inner cover openings 28a only are in driving contact with the inner spring ends.

A definite advantage exists in providing a secondary cover in a coaxial damper spring arrangement such as disclosed. Not only does the auxiliary cover provide an ideally located flat drive surface area, i.e., side walls 28b, for the inner spring ends, but it further creates additional driving surface area for the outer spring ends.

Axial space is of utmost importance and is very limited in heavy duty vehicle clutches. It is difficult to provide greater drive area for the springs merely by increasing the thickness of the main covers because, in most applications, the length of the clutch assembly is specifically defined by the vehicle manufacturer and cannot be easily changed. Because higher loading is being imposed on present damper springs by higher torque rise engines, means other than increased cover thickness must be provided so that increased stresses will not be developed at critical points, i.e., opening end walls and spring ends. This could result in damage to the part and premature clutch failure.

Figure 6:
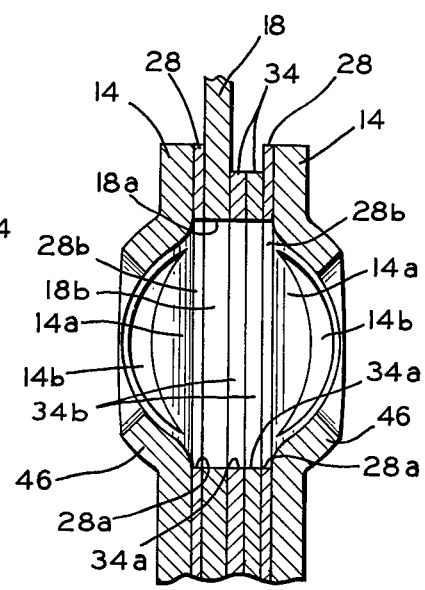
FIG. 6 is a fragmentary section view taken along line 6—6 of FIG. 1 with the resilient drive means removed.

Further, manufacturing procedures are such that when constructing outer cover openings, it is practically impossible to form a perfectly square or flat end wall for driving contact with the outer spring ends. It is known that the greater drive area provided for the spring ends, the better the load distribution and therefore the greater the torque capacity of the system. The actual drive area presented in this instance is most clearly shown in FIG. 6 and consists of substantially half-moon shaped portions indicated by reference numerals 14b. In the present coaxial spring arrangement, the drive surface area that would be made available for engaging and driving the outer spring ends is not the most satisfactory condition. The present invention improves this oondition by putting the thin auxiliary covers 28 inside the main covers 14. In this arrangement, the auxiliary covers 28 are positioned so that the end walls 28b, as seen in FIG. 5, are aligned with the coil portion of the smaller inner spring 26. Thus the plate thickness of the auxiliary covers 26 is constructed and located to interesect the smaller inner spring 26 across substantially the entire diameter of the end coil portions of the springs 26, thereby providing an ideal square engaging surface for the inner spring ends. An additional benefit to this construction is that the engaging and drive surface inner cover opening end walls 28b are located in a position to engage and thereby create a second contact or drive point for the ends of outer springs 24, thereby producing more drive area for the outer springs.

From the foregoing it will be apparent that the present invention, by providing auxiliary covers inside of conventional outer covers, provides an ideal drive condition for inner springs 24 without increasing the length of the clutch 10.

Briefly, the power flow through the clutch disc 10 when torque is being transmitted from the engine to the transmission (not shown) with the clutch engaged, is to friction support plate 18, end walls 18b and 34b of support and reinforcing plates 18 and 34, to the ends of coaxial springs 24 and 26 to end walls 14b and 28b resulting in a resilient drive being transmitted to covers 24 and 28 and associate hub 12.

In a torque transmitting device of the type described, the damper connection can easily be modified to fit numerous requirements. For example, the torque and deflection rates can be increased or decreased by modifying one or both of the springs so that their capacities vary to suit a particular application. Thus, the coaxial spring damper of the present invention can easily be adapted to provide the necessary damping needed to tune the entire vehicle drive train system so that critical torsional vibrations are moved out of the operating speed range of the newer high torque engines and the rest of the vehicle drive train.

Further, the resilient members could be constructed in the form of one or more solid or tubular rubber elements. As an example, the outer spring could be a coil spring such as illustrated or a tubular rubber sleeve while the inner member could be a solid or tubular sleeve.

Having thus described a preferred embodiment of the present invention, it should be understood that the invention is not to be limited to the specific construction and arrangement described. It will be apparent to those skilled in the art that modifications or alterations may be made without departing from the spirit and scope of the invention as set forth in the appended claims.

I claim:

1. A torque transmitting device comprising:
   a rotatable drive member,
   a rotatable driven member adapted for limited rotation relative to said drive member,
   a main and auxiliary cover secured to one of said drive and driven members for rotation therewith,
   means defining at least one opening in each of said drive member or driven member and said main and auxiliary covers, each of said openings being aligned with the other and having spaced side walls,
   resilient means in said openings for resiliently and drivingly connecting said drive and driven members,
   said resilient means comprising a first resilient member and a second resilient member disposed within said first resilient member,
   said first resilient member having end portions in driving engagement with said side walls in one of said drive member, said driven member and said auxiliary cover openings, and said second resilient member having end portions in driving connection with said auxiliary cover opening side walls.

2. A torque transmitting device according to claim 1 wherein one of said drive and driven members further comprises a hub having a flange, said main and auxiliary covers mounted on the same side of said flange.

3. A torque transmitting device according to claim 2 further comprising a second main and auxiliary cover mounted on the opposite side of said flange.

4. A torque transmitting device according to claim 3 wherein said auxiliary covers are aligned with said second resilient member.

5. A torque transmitting device according to claims 1 and 4 wherein said resilient members are coil springs.

6. A torque transmitting device according to claim 5 wherein said coil springs have equal lengths.

7. A torque transmitting device according to claim 6 wherein said coil springs are held in tension between said opening side walls.

* * * * *